Patented Apr. 2, 1946

2,397,548

UNITED STATES PATENT OFFICE 2,397,548

RESINOUS CONDENSATION PRODUCTS

William O. Kenyon and William F. Fowler, Jr., Rochester, N. Y., assignors to Eastman Kodak Company, Rochester, N. Y., a corporation of New Jersey No Drawing. Application August 22, 1942,
Serial No. 455,810

17 Claims. (Cl. 260—73)

This invention relates to resinous condensation products and more particularly to resinous condensation products which are resistant to swelling in both water and organic liquids.

A number of resinous condensation products are known which are resistant to swelling in both water and organic liquids. However, such known condensation products are usually highly colored and are characterized by brittleness. Our new condensation products, on the other hand, are not only in many cases resistant to swelling in both water and organic liquids but are characterized additionally by being in many cases substantially colorless and by being, in practically all cases, much less refractory than the known resinous condensation products.

It is, accordingly, an object of our invention to provide new resinous condensation products. A further object is to provide a process for preparing such condensation products. Other objects will become apparent hereinafter.

In accordance with the invention, we prepare resinous condensation products by condensing an aldehyde or ketone capable of acetal or ketal formation, with an at least partially deesterified copolymer of an unsaturated compound of the following general formula:

I.
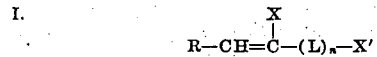

wherein L represents a divalent carbon radical, $n$ represents a positive integer, R represents hydrogen or an aliphatic group, and X and X' each represents the same or different deesterifiable groups and an unsaturated compound of the following general formula:

II.

wherein R represents a non-deesterifiable group and X represents a deesterifiable group.

As shown in our copending application Serial No. 442,452, filed May 11, 1942, the aforesaid copolymers can be deesterified and while still in solution the deesterification product can be condensed with an aldehyde or ketone, and the resulting solution coated and the coating dried. Such a coating is insoluble in both hot and cold water as well as in common organic solvents.

We have also found that our new condensation products can be prepared in bulk more advantageously by deesterifying the aforesaid copolymers in the presence of an aldehyde or ketone capable of undergoing acetal or ketal formation.

Our new condensation products are not to be confused with known polyvinyl acetal resins which have been prepared by condensing aldehydes or ketones with deesterified polyvinyl carboxylic esters or copolymers of vinyl carboxylic esters with vinyl chloride or methyl acrylate. Such known polyvinyl acetal resins are generally soluble in organic solvents and may be considered as comprising polyvinyl acetal chains. On the other hand, our new resinous condensation products are insoluble in organic solvents (or become so upon heating) and are thought to comprise polymeric chains between which an appreciable number of cross-linking chains exist.

As unsaturated compounds of general Formula I the following are exemplary: carboxylic esters of 2-halogen-allyl alcohols, e. g. 2-chloro-allyl acetate, 2-chloro-allyl carbamate, 2-chloro-allyl methyl carbonate and carboxylic esters of 2-halogeno-crotonyl alcohol. As unsaturated compounds of Formula II which copolymerize with the compounds of Formula I, the following are exemplary: vinyl carboxylic esters, e. g. vinyl acetate, vinyl carbamate and vinyl methyl carbonate.

The ratio in the copolymer of unsaturated compounds of Formula I to the unsaturated compounds of Formula II can be any desired ratio. Generally speaking the amount of unsaturated compound of Formula I which can be introduced into the copolymer is limited by the nature of the copolymerizing materials, the copolymerization proceeding to give copolymers containing a minority of units corresponding to compounds of Formula I. A group of our new resins which are highly useful can be obtained from copolymers involving from about 1 to about 14 percent of an unsaturated compound of Formula I and the remainder of an unsaturated compound of Formula II.

As aldehydes and ketones in the presence of which to effect the deesterification, we employ those capable of undergoing acetal or ketal formation. The following are exemplary: acetaldehyde, n-butyraldehyde, isobutyraldehyde, heptaldehyde, 2-ethyl-hexaldehyde, crotonaldehyde, decatetraenal, sorbicaldehyde, octatrienal, chloroacetaldehyde, benzaldehyde, chlorobenzaldehyde, nitrobenzaldehyde, cyclohexanone and methylcyclohexanone. Generally speaking, the saturated aliphatic aldehydes of lower carbon content give resins of the best resistance to swelling in organic liquids. However, to obtain a resin of maximum resistance to swelling in both water and organic liquids, the carbon content of the aldehyde employed should not be too low. The butyraldehydes appear to provide especially useful condensation products. On the other hand, with the unsaturated aliphatic aldehydes, octatrienal and decantetraenal both give condensation products of good resistance to swelling in water and in organic solvents, although these condensation products are colored. More than one aldehyde or ketone or a mixture of aldehyde and ketone can be employed, if desired.

Instead of employing the aldehyde or ketone per se, derivatives which, under the conditions of the deesterification, yield aldehyde or ketone may be employed. Thus methacrolal, the simple dimethyl acetal of $\alpha$-methacrolein, is advantageously employed instead of $\alpha$-methocrolein itself. Polymeric aldehydes, such as trioxymethylene or paraldehyde can also be used.

The deesterifications are advantageously effected in the presence of a deesterification catalyst, e. g. an acid, such as hydrochloric acid or sulfuric acid. Moreover, the deesterification is advantageously effected in an alcohol, e. g. methyl alcohol, ethyl alcohol or n-propyl alcohol. Initial water can be excluded from the reaction mixture so that the deesterification is effected by alcoholysis. When a substantially anhydrous alcohol is employed as the deesterifying means, together with a simple acetal or ketal, it seems probable that the simple acetal or ketal reacts directly with the deesterified copolymer to give the resinous condensation product without the intermediate formation of the corresponding aldehyde or ketone. This process embodiment where the simple acetal or ketal is employed with a substantially anhydrous alcohol, is faster (4 to 6 hours for the condensation to attain completion) than the process where the free aldehyde is used. This increase in velocity is due to the fact that no water (an inhibitor) is liberated, whereas water is liberated when free aldehyde or ketone is employed. Moreover, some aldehydes, like $\alpha$-methacrolein and crotonaldehyde, have a strong lachrymatory action while the simple acetals of these aldehydes are not irritating in this way.

The following examples will serve to illustrate our new condensation products and the manner of obtaining the same:

*Example 1.—Acetaldehyde condensation product*

To 400 g. of a 4.81 percent solution of a deesterified copolymer of vinyl acetate and 2-chloroallyl acetate containing four percent of the latter, at a pH of 3.5, were added 20 g. of acetaldehyde. The mixture was cooled to 3° C. and after 1 hour's standing at this temperature, 5 cc. of concentrated hydrochloric acid were added. After 1 hour's additional standing, the solution had a gelling point of 19.5° to 20° C. A coating was made at 25° C. and allowed to stand for 16 hours. At the end of this time a clear sheet resulted which was insoluble in both hot and cold water as well as in the common organic solvents.

*Example 2.—Crotonaldehyde condensation product*

500 g. of a copolymer of vinyl acetate and 2-chloroallyl acetate, containing 2.5 percent of 2-chloroallyl acetate were dissolved in 5 liters of methanol. While mechanically stirring the solution, there were added dropwise 800 cc. of a 3.5 normal solution of hydrogen chloride. After the addition, stirring was continued for another hour when the viscosity of the mixture commenced to increase. At this time 122 g. of crotonaldehyde were added to the mixture dropwise with stirring. The transparent solution which resulted was permitted to stand for 16 hours at 20° to 25° C. The condensation product was precipitated from the solution by pouring the solution into running water at 60° C. Tests indicated that the precipitated resin would redissolve in methanol at this stage. The precipitated resin was cut into small pieces and allowed to wash in running water at 60° C. for 16 hours. At the end of 3 hours' washing at this temperature, tests showed that the resin was now only swollen in methanol. After 16 hours' washing, the pieces of condensation product were spread upon paper and permitted to dry for 72 hours at 20° to 25° C. in a current of air. The yield was 404 g. A 2.5 g. sample of the dried condensation product was molded without addition of a plasticizer in a molding press for 29 seconds at a temperature of 125° C. and a total pressure of 12 tons. The molded button was transparent and pale yellow in color. The molded product was insoluble in water and in the common organic solvents including benzene, aliphatic hydrocarbons such as Skellysolve, and methanol, although some swelling occurred on long contact with methanol. Pieces of the condensation product placed in water remained transparent up to a temperature of 50° C., at which point they became opaque.

*Example 3.—Crotonaldehyde condensation product*

500 g. of a copolymer of vinyl acetate and 2-chloroallyl acetate, containing 2.5 percent of 2-chloroallyl acetate, were dissolved in 5 liters of methanol. To the resulting solution were added dropwise with mechanical stirring 125 cc. of concentrated aqueous hydrochloric acid. After the hydrochloric acid was added, the stirring was continued for 1 hour with no apparent increase in the viscosity of the solution. At this time 122 g. of crotonaldehyde were added to the mixture dropwise with stirring. The resulting clear solution was permitted to stand at 20° at 25° C. for 1 week. At the end of this period, the partially gelled reaction mixture was poured into running water at 60° C. to precipitate the condensation product. The precipitated condensation product was washed and dried as in Example 2. The yield was 343 g. A 2.5 g. sample of the dried condensation product was molded without addition of plasticizer in a molding press for 60 seconds at a temperature of 130° C. and a total pressure of 12 tons. The observed properties of the molded product were the same as those of the condensation product of Example 2.

*Example 4.—$\alpha$-Methacrolein condensation product*

500 g. of a copolymer of vinyl acetate and $\beta$-chloroallyl acetate containing 3 percent of $\beta$-chloroallyl acetate were dissolved in 5 liters of methanol. To the resulting solution were added dropwise 800 cc. of a 3.5 normal solution of hydrogen chloride in methanol, while mechanically stirring. After the addition the mixture was stirred for a further hour when the viscosity of the mixture commenced to increase. At this time 122 g. of $\alpha$-methacrolein were added dropwise to the mixture with stirring. The resulting clear solution was permitted to stand at 20° to 25° C. for 16 hours. At the end of this time a rigid gel had formed. This gel was formed to be highly friable and was broken up with a glass rod. The pieces of gel were ground in a mortar to smaller size and washed for 16 hours in running water at 60° C. The condensation product was dried as in Example 2. The yield was 290 g. A 2.5 g. sample of the dried condensation product was molded without addition of a plasticizer in a molding press for 90 seconds at a temperature of 145° C. and a total pressure of 16 tons. A clear pale yellow button was obtained which exhibited properties similar to those of the molded sample of Example 2, except that swelling was not so pronounced.

*Example 5.—Sorbic aldehyde condensation product*

47 cc. of a 3.5 normal solution of hydrogen chloride in methanol were added dropwise with mechanical stirring to 294 cc. of a 10 percent methanol solution of a copolymer of vinyl acetate and β-chloroallyl acetate made by polymerizing a mixture of vinyl acetate containing 2.5 percent by weight of β-chloroallyl acetate. After the addition, the resulting mixture was stirred for 1 hour. At this time 8.5 g. of sorbic aldehyde were added to the reaction mixture with stirring. The resulting mixture was allowed to stand for 16 hours at 20° to 25° C. At the end of this time a friable gel had formed which was dried in the same manner as the gel mentioned in the above example. The yield of dried condensation product was 20 g. A 2.5 g. sample of the dried condensation product was molded without the addition of a plasticizer in a molding press for 60 seconds at a temperature of 150° C. and a total pressure of 12 tons. A deep red, translucent button resulted which was only slightly swollen in methanol.

*Example 6.—Octatrienal condensation product*

This condensation product was prepared exactly like the condensation product of Example 5. The following quantities of reactants were employed: 37.1 cc. of 3.5 normal solution of hydrogen chloride in methanol, 232 cc. of a 10 percent methanol solution of the copolymer and 8 g. of octatrienal. The yield of condensation product was 15 g. A 2.5 g. sample of the condensation product was molded as in Example 5. A very deep red button was formed which was even more resistant to swelling in organic solvent and water than was the sorbic aldehyde condensation product.

*Example 7.—Decatetraenal condensation product*

This condensation product was prepared like the condensation product in Example 5. The following quantities of reactants were employed: 23.7 cc. of a 3.5 normal solution of hydrogen chloride in methanol, 1.48 cc. of a 10 percent methanol solution of the copolymer and 6.3 g. of decatetraenal. The yield of condensation product was 10 g. A 2.5 g. sample of the condensation product was molded under the same conditions, as employed in Example 5. A black button was formed which became swollen to only a very minute extent in organic solvents.

*Example 8.—n-Heptaldehyde condensation product*

125 cc. of concentrated hydrochloric acid were added dropwise with machine stirring to 5 liters of a 10 percent solution in methanol of a heteropolymer of vinyl acetate and 2-chloroallyl acetate, containing 2.5 percent of the latter. To this mixture, 200 g. of n-heptaldehyde were added dropwise with stirring. This mixture was allowed to stand at 20° to 25° C. After 4 days standing, a milky color had developed in the solution; this was removed by the addition of 260 cc. of benzene to the reaction mixture with machine stirring. After 7 days standing, the reaction mixture had set up to a loose, white-opaque gel, which was removed from the flask, cut up into small pieces, washed in running hot water for 24 hours, and then dried at 20° to 25° C. for a week. Yield was 365 g.

A 2.5 g. sample of the dried condensation product was molded without the addition of a plasticizer in a molding press for 60 seconds at a temperature of 125° C. and a total pressure of 12 tons. The molded button was pale reddish-brown in color and transparent. It was insoluble in water and various organic solvents including Skellysolve (essentially low-boiling hydrocarbons), benzene, methanol, and various mixtures of the last two solvents. It was highly swollen by 50 percent benzene—50 percent methanol (by volume). It is highly resistant to swelling in water.

*Example 9.—2-ethylhexaldehyde condensation product*

800 cc. of a 3.5 N solution of hydrogen chloride in methanol was added dropwise to a mechanically stirred solution of 500 g. of a copolymer of vinyl acetate and 2-chloroallyl acetate (containing 0.77 percent Cl) in 5 kg. of methanol. 224 g. of 2-ethyl hexaldehyde was then added slowly and stirring was continued for an additional 30 minutes. The resulting solution was left at room temperature for 40 hours. The opaque, partially gelled product was poured into hot (60° C.) water, kneaded well, pulled into small pieces, and washed for three hot days with running hot water. After drying for a week at 20° to 25° C. in a stream of air, the yield was 424 g.

A 2.5 g. sample of the dried condensation product was molded without the addition of a plasticizer in a molding press for 60 seconds at a temperature of 125° C. under a total pressure of 12 tons. The molded button was pale yellow and transparent. It was insoluble in water and various organic solvents including Skellysolve (essentially low-boiling hydrocarbons), benzene, methanol, and various mixtures of the last two solvents.

*Example 10.—n-Butyraldehyde condensation product*

800 cc. of a 3.5 N solution of hydrogen chloride in methanol was added dropwise to a mechanically stirred solution of 500 g. of a copolymer of vinyl acetate and 2-chloroallyl acetate (Cl=0.77 percent) in 5 kg. of methanol. 125 g. of n-butyraldehyde was then added slowly and stirring was continued for an additional 30 minutes. The resulting clear solution was left at room temperature for 4 days, when it was partially gelled but still clear. The product was precipitated into hot (60° C.) water, kneaded well, pulled into small pieces, washed for 3 days in running hot water, and then dried at 20° to 25° C. in a stream of air. The yield of dried product was 324 g.

A 2.5 g. sample of the dried condensation product was molded without plasticizer in a molding press for 60 seconds at a temperature of 125° C. under a total pressure of 12 tons. The molded button was pale yellow and transparent. It was insoluble in water and various organic solvents including Skellysolve (essentially low-boiling hydrocarbons), benzene, methanol, and various mixtures of the last two solvents.

Example 11.—Crotonaldehyde diethyl acetal condensation product

To 4330 cc. of a 13.8 percent methanol solution containing 500 g. of a copolymer of vinyl acetate and 2-chloroallyl acetate, prepared by copolymerizing a mixture of 2.5 percent by weight of the chloroallyl compound and 97.5 percent of vinyl acetate, were added dropwise with stirring 800 cc. of 3.52 normal hydrogen chloride in methanol. The mixture was stirred for a short time and then 300 g. of crotonaldehyde diethyl acetal were added all at one time with stirring. The mixture was allowed to stand for 16 hours at 20° to 25° C. At the end of that time a rigid gel had formed which was broken up and kneaded well in hot water at 60° C. A pale brown, doughy precipitate resulted which was cut up into small pieces and washed in running hot water for 16 hours. The resin was next dried for 48 hours at room temperature in a current of air. The yield of dried condensation product was 405.6 g.

A 2.5 g. sample of the dried condensation product was molded in a molding press without the addition of a plasticizer for 60 seconds at 125° C. under a total pressure of 7 tons. A pale yellow, transparent button was obtained which became highly swollen in methanol and methanol-benzene mixtures, but less so in water, benzene and Skellysolve G.

Example 12.—Acetaldehyde diethyl acetal condensation product

To 4330 cc. of a 13.8 percent methanol solution containing 500 g. of a copolymer of vinyl acetate and 2-chloroallyl acetate, prepared by copolymerizing a mixture of 2.5 percent of the chloroallyl compound and 97.5 percent of vinyl acetate, were added dropwise with mechanical stirring 800 cc. of 3.52 normal hydrogen chloride in methanol. The mixture was stirred for a short time and then 206 g. of acetaldehyde diethyl acetal were added all at one time with stirring. The mixture was allowed to stand at 20° to 25° C. for 16 hours. At the end of that time, a rigid gel had formed, which was broken up and kneaded thoroughly in hot water at 60° C. A white, doughy precipitate resulted which was cut up into small pieces and washed in running hot water for 16 hours. After the washing, the condensation product was dried for 48 hours at room temperature in a current of air. The yield was 208.6 g. of dried material.

A 2.6 g. sample of the dried condensation product was molded in a molding press without the addition of a plasticizer for 45 seconds at 125° C. under a total pressure of 12 tons. A pale yellow, transparent button was obtained which became highly swollen in water, methanol, and methanol-benzene mixtures and slightly swollen in Skellysolve G (essentially low-boiling hydrocarbons) and benzene.

Example 13.—Propionaldehyde condensation product

To 4330 cc. of 13.8 percent methanol solution containing 500 g. of a copolymer of vinyl acetate and 2-chloroallyl acetate, prepared by polymerizing a mixture of 2.5 percent of the chloroallyl compound with 97.5 percent of vinyl acetate, were added dropwise with mechanical stirring 800 cc. of 3.52 normal hydrogen chloride in methanol. The mixture was stirred for one hour and then 101 g. of propionaldehyde were added dropwise with stirring. The mixture was then permitted to stand for 16 hours at room temperature. The resultant loose gel was poured into hot water at 60° C. and thoroughly kneaded. A white doughy precipitate resulted which was cut up into small pieces and washed for 16 hours in hot running water. The resin was then dried for 48 hours at room temperature in a stream of air. The yield was 280 g. of dried condensation product.

A 2.5 g. sample of the condensation product was molded without the addition of a plasticizer in a molding press for 45 seconds at 125° C. under a total pressure of 12 tons. A pale yellow, transparent button was obtained which became highly swollen in water, methanol, and benzene-methanol mixtures; and slightly swollen in Skellysolve G (essentially low-boiling hydrocarbons) and benzene.

Example 14.—n-Valeraldehyde condensation product

To 2890 cc. of a 13.8 percent methanol solution containing 333 g. of a copolymer of vinyl acetate and β-chloroallyl acetate, prepared by polymerizing a mixture of 2.5 percent by weight of the chloroallyl compound and 97.5 percent of vinyl acetate, were added dropwise with mechanical stirring, 534 cc. of 3.52 normal hydrogen chloride in methanol. The mixture was stirred for one-half hour and then 105 g. of freshly distilled n-valeraldehyde were added dropwise to the mixture. After thorough mixing, the dope was permitted to stand for 16 hours at 20° to 25° C. At the end of that time, a loose gel had formed which was poured into hot water at 60° C. and kneaded thoroughly. A white, doughy precipitate resulted, which was cut up into small pieces and washed in running hot water for 16 hours. At the end of that period the condensation product was dried at 20° to 25° C. in a stream of air for 30 hours. The yield of dried polymer was 212.3 g.

A 2.5 g. sample of the condensation product was molded without the addition of a plasticizer in a molding press for 60 seconds at 125° C. under a total pressure of 12 tons. A pale yellow, transparent button was obtained which only became slightly swollen in water and certain organic solvents such as benzene and Skellysolve G (essentially low-boiling hydrocarbons). In methanol and methanol-benzene mixtures, swelling was more pronounced.

Example 15.—n-Hexaldehyde condensation product

To 4330 cc. of a 13.8 percent methanol solution, containing 500 g. of a copolymer of vinyl acetate and β-chloroallyl acetate, prepared by polymerizing a mixture of 2.5 percent of chloroallyl acetate with 97.5 percent by weight of vinyl acetate, were added dropwise with mechanical stirring 800 cc. of 3.52 normal hydrogen chloride in methanol while nitrogen was bubbled through the solution. After one-half hour of stirring, 174 g. of n-hexaldehyde were added dropwise while nitrogen was bubbled through the solution. The solution was then tightly stoppered and allowed to stand for 16 hours under an atmosphere of nitrogen. Oxygen was excluded in order to reduce the oxidation of the n-hexaldehyde to a minimum. At the end of 16 hours a very deep purple gel had formed. This was broken up, placed in a 10-gallon crock containing water at 60° C., and thoroughly kneaded. A pale brown, doughy precipitate resulted. This was cut up into small pieces and washed in running hot water for 16 hours. It was then dried at room temperature in a stream of air for 48 hours. The yield was 347.4 g.

A 2.5 g. sample of the condensation product was molded without the addition of a plasticizer in a molding press for 60 seconds at 125° C. under a total pressure of 12 tons. A pale brown, transparent button was obtained which only become slightly swollen in water and certain organic solvents such as benzene and Skellysolve G (essentially low-boiling hydrocarbons). Swelling in methanol and methanol-benzene mixtures was more pronounced.

The following table shows the swelling characteristic of various of our new condensation products in water and in organic liquids.

| Aldehyde | Percent swell in solvent after 40-hour soak | | | |
|---|---|---|---|---|
| | $H_2O$ | Benzene | Skellysolve (essentially low-boiling hydrocarbons) | Methyl alcohol |
| Crotonaldehyde | 23.9 | 13.8 | −1.4 | 149.2 |
| Sorbicaldehyde | 23.5 | 8.3 | 9.8 | 29.5 |
| Octatrienal | 6.0 | 0.0 | 1.3 | 21.3 |
| Decatetraenal | 4.0 | 0.0 | 0.7 | 20.7 |
| Crotonaldehyde | 25.8 | 24.0 | 1.0 | 88.7 |
| α-Methacrolal | 17.4 | 0.6 | 0.0 | |
| α-Methacrolal | 33.1 | 0.7 | 0.7 | 50.0 |
| n-Heptaldehyde | 4.1 | 48.2 | 22.1 | 49.1 |
| n-Butyraldehyde | 4.3 | 0.0 | 0.0 | Disint |
| 2-ethyl hexaldehyde | 1.0 | 36.2 | 12.2 | 43.9 |
| Crotonaldehyde diethyl acetal | 38.2 | 19.7 | 0.7 | Disint |
| Acetaldehyde diethyl acetal | Disint | 0.0 | 0.8 | Disint |
| Propionaldehyde | Disint | 0.7 | 0.6 | Disint |
| n-Valeraldehyde | 2.4 | 31.3 | 0.0 | 70.6 |
| n-Hexaldehyde | 2.5 | 2.0 | 1.0 | 71.0 |

"Disint" means disintegrated or became swollen and fell apart.

Our new condensation products prepared from unsaturated aldehydes or acetals of unsaturated aldehyde can be hot compounded by working the condensation product between steam-heated rollers. Our new condensation products prepared from unsaturated aldehydes or acetals of unsaturated aldehydes can be mixed with sulfur and other materials used in the vulcanization of rubber, such as zinc oxide and accelerators, e. g. mercaptobenzothiazole and di- and tribenzyl-guanidine, and the mixture treated with heat as in ordinary rubber vulcanization processes.

Copolymers from which condensation products are prepared are described in our copending application Serial No. 442,452, filed May 11, 1942, and also in the copending application of W. O. Kenyon and J. H. Van Campen, Serial No. 442,454, filed May 11, 1942.

What we claim as our invention and desire to be secured by Letters Patent of the United States is:

1. A resinous condensation product prepared by at least partially deesterifying, in the presence of an acid deesterification catalyst and a carbonyl compound selected from the group consisting of aldehydes, cyclohexanone and methyl-cyclohexanone, a copolymer of a mono-vinyl ester of a saturated monocarboxylic acid containing not more than 2 carbon atoms with a mono-2-chloroallyl ester of a saturated monocarboxylic acid containing not more than 2 carbon atoms, the 2-chloroallyl ester constituting from about 1 to about 14 per cent by weight of the copolymer.

2. A resinous condensation product prepared by at least partially deesterifying, in the presence of an acid deesterification catalyst and a carbonyl compound selected from the group consisting of aldehydes, cyclohexanone and methylcyclohexanone, a copolymer of vinyl acetate and 2-chloroallyl acetate, the 2-chloroallyl acetate constituting from about 1 to about 14 per cent by weight of the copolymer.

3. A resinous condensation product prepared by at least partially deesterifying, in the presence of an acid deesterification catalyst and n-butyraldehyde, a copolymer of vinyl acetate and 2-chloroallyl acetate, the 2-chloroallyl acetate constituting from about 1 to about 14 per cent by weight of the copolymer.

4. A resinous condensation product prepared by at least partially deesterifying, in the presence of an acid deesterification catalyst and n-butyraldehyde, a copolymer of vinyl acetate and 2-chloroallyl acetate, the copolymer containing 2-chloroallyl acetate in an amount equivalent to about 0.77 per cent by weight of chlorine.

5. A resinous condensation product prepared by at least partially deesterifying, in the presence of an acid deesterification catalyst and propionaldehyde, a copolymer of vinyl acetate and 2-chloroallyl acetate, the 2-chloroallyl acetate constituting from about 1 to about 14 per cent by weight of the copolymer.

6. A resinous condensation product prepared by at least partially deesterifying, in the presence of an acid deesterification catalyst and propionaldehyde, a copolymer of vinyl acetate and 2-chloroallyl acetate, the 2-chloroallyl acetate constituting about 2.5 per cent by weight of the copolymer.

7. A resinous condensation product prepared by at least partially deesterifying, in the presence of an acid deesterification catalyst and an unsaturated aliphatic aldehyde, a copolymer of vinyl acetate and 2-chloroallyl acetate, the 2-chloroallyl acetate constituting from about 1 to about 14 per cent by weight of the copolymer.

8. A resinous condensation product prepared by at least partially deesterifying, in the presence of an acid deesterification catalyst and α-methacrolein, a copolymer of vinyl acetate and 2-chloroallyl acetate, the 2-chloroallyl acetate constituting from about 1 to about 14 per cent by weight of the copolymer.

9. A resinous condensation product prepared by at least partially deesterifying, in the presence of an acid deesterification catalyst and α-methacrolein, a copolymer of vinyl acetate and 2-chloroallyl acetate, the 2-chloroallyl acetate constituting about 3 per cent by weight of the copolymer.

10. A process for preparing a resinous condensation product comprising at least partially deesterifying, in the presence of an acid deesterification catalyst and a carbonyl compound selected from the group consisting of aldehydes, cyclohexanone and methylcyclohexanone, a copolymer of a mono vinyl ester of a saturated monocarboxylic acid containing not more than 2 carbon atoms with a mono 2-chloroallyl ester of a saturated monocarboxylic acid containing not more than 2 carbon atoms, the 2-chloroallyl ester constituting from about 1 to about 14 per cent by weight of the copolymer.

11. A process for preparing a resinous condensation product comprising at least partially deesterifying, in the presence of an acid deesterification catalyst and a carbonyl compound selected from the group consisting of aldehydes, cyclohexanone and methylcyclohexanone, a copolymer of vinyl acetate and 2-chloroallyl acetate, said 2-chloroallyl acetate constituting from about 1 to about 14 per cent by weight of the copolymer.

12. A process for preparing a resinous condensation product comprising at least partially deesterifying, in the presence of an acid deesterification catalyst and n-butyraldehyde, a copolymer of vinyl acetate and 2-chloroallyl acetate, the 2-chloroallyl acetate constituting from about 1 to about 14 per cent by weight of the copolymer.

13. A process for preparing a resinous condensation product comprising at least partially deesterifying, in the presence of an acid deesterification catalyst and n-butyraldehyde, a copolymer of vinyl acetate and 2-chloroallyl acetate, the copolymer containing 2-chloroallyl acetate in an amount equivalent to about 0.77 per cent by weight of chlorine.

14. A process for preparing a resinous condensation product comprising at least partially deesterifying, in the presence of an acid deesterification catalyst and propionaldehyde, a copolymer of vinyl acetate and 2-chloroallyl acetate, the 2-chloroallyl acetate constituting from about 1 to about 14 per cent by weight of the copolymer.

15. A process for preparing a resinous condensation product comprising at least partially deesterifying, in the presence of an acid deesterification catalyst and propionaldehyde, a copolymer of vinyl acetate and 2-chloroallyl acetate, the 2-chloroallyl acetate constituting about 2.5 per cent by weight of the copolymer.

16. A process for preparing a resinous condensation product comprising at least partially deesterifying, in the presence of an acid deesterification catalyst and an unsaturated aliphatic aldehyde, a copolymer of vinyl acetate and 2-chloroallyl acetate, the 2-chloroallyl acetate constituting from about 1 to about 14 per cent by weight of the copolymer.

17. A process for preparing a resinous condensation product comprising at least partially deesterifying, in the presence of an acid deesterification catalyst and α-methacrolein, a copolymer of vinyl acetate and 2-chloroallyl acetate, the 2-chloroallyl acetate constituting about 3 per cent by weight of the copolymer.

WILLIAM O. KENYON.
WILLIAM F. FOWLER, Jr.